3,225,124
METHOD OF MOLDING A FOAMED PLASTIC COVERING ON AN ARTICLE
Robert T. Wallace, Toledo, Ohio, assignor to Owens-Illinois, Inc., a corporation of Ohio
Filed June 16, 1961, Ser. No. 117,556
8 Claims. (Cl. 264—45)

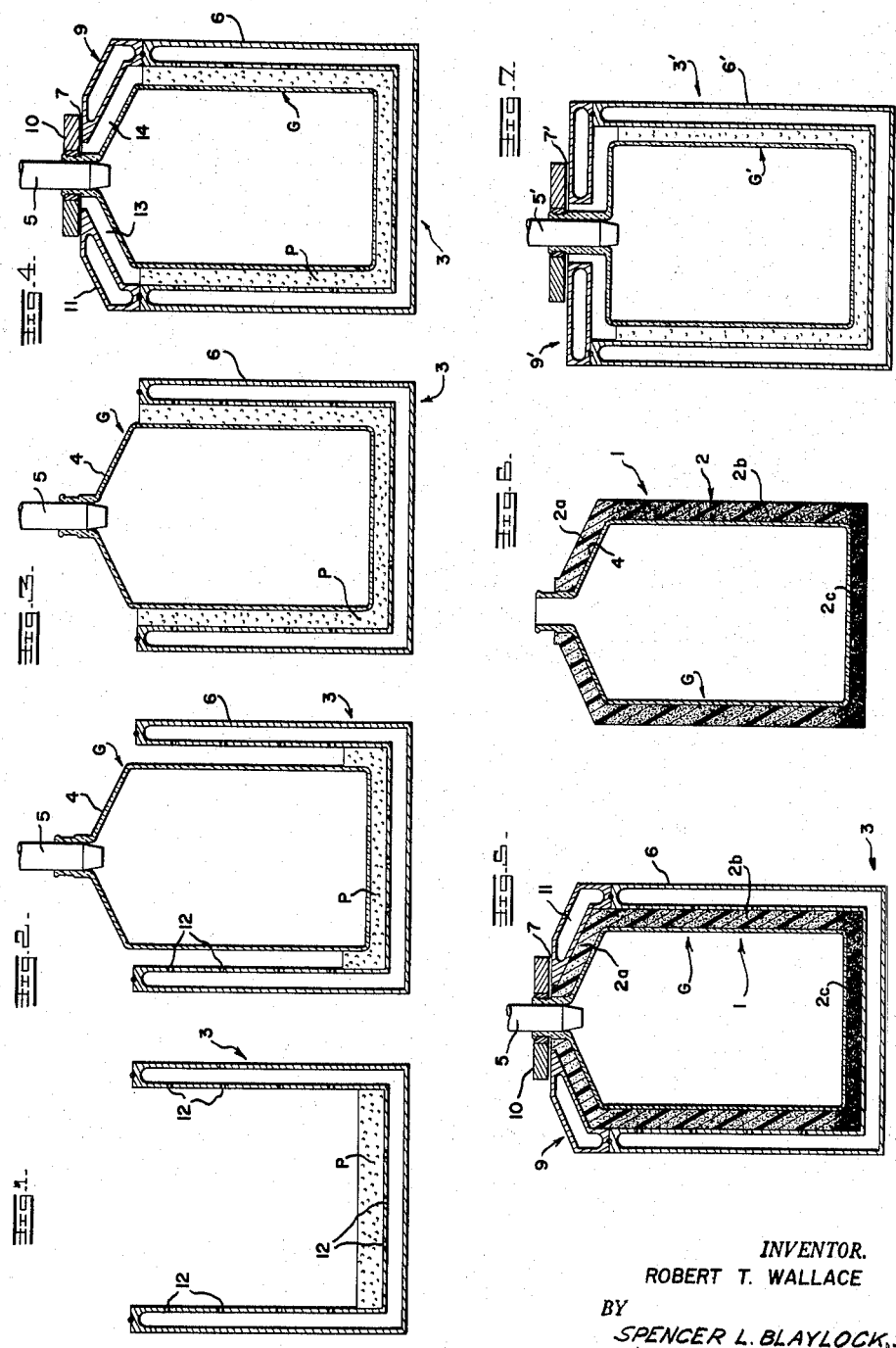

This application is a continuation-in-part of my application Serial No. 832,082 filed August 6, 1959, entitled, Plastic Coated Articles and Method for Making the Same, now Patent No. 3,007,594.

This invention relates generally to fragile articles and more particularly to glass containers which have improved resistance to breakage due to mechanical shock. More specifically this invention is directed to articles such as glass containers having a surface which is modified by application of a plastic coating or casing thereto for the purpose of making the articles less susceptible to cracking or breaking due to mechanical impact and to a method for making such plastic coated containers.

It has been customary in order to minimize breakage to encase large glass containers, such as carboys, in packing material all of which is placed in a cardboard or wooden box. These have been found to have a number of disadvantages including bulkiness and excessive weight. In addition with some of the large carboys of six and one-half gallons capacity and which may be used for holding drinking water, the cost of the packing has exceeded the cost of the liquid stored therein. Finally in spite of all of the packing material used plus its enclosing carton, the glass carboy has often been broken in shipping. Where the carboy contains corrosive chemicals, there is also the danger of damaging other containers nearby or injuring individuals who have to handle the carboys.

In the manufacture of protective plastic casings for fragile articles it would be desirable to form the same with walls with variable density in order that the casings will be stronger in certain areas so to withstand the added stress and strain they have to undergo in contrast to areas which are subject to less shock which can be made less dense. This has the further advantage in that it results in a more efficient utilization of a given amount of molding material used to make the casing.

In view of the above problems associated with packing fragile containers for shipping it is an object of this invention to provide the containers which have a greater resistance to mechanical breakage.

It is another object of this invention to provide a coating for a container which is less bulky and lighter in weight than present packing containers used to encase fragile articles.

A further object of this invention is to provide a fragile container with a coating of variable density for protection against breakage whereby the density and therefore the strength of the coating will be greatest where the container is subject to the greatest mechanical impact and shock.

A further object of this invention is to provide a method for fabricating the walls of casings whose walls will be adapted to withstand variable stresses and strain.

A further object of this invention is to provide a preferred method for shaping plastic casings in which the walls are denser in those areas subject to greater stress and shock and less dense in those areas which are subject to lesser stress and shock.

A further object is to provide a method for producing cellular plastic casings in which the plastic materials which make up the casings are more efficiently utilized to provide casings of maximum strength under varying conditions of stress, strain and shock.

A further object is to provide a method for producing cellular plastic casings which are lighter and yet stronger than conventional casings presently being employed in which the plastic materials which make up the casings are more efficiently utilized to provide casings of maximum strength under varying conditions of stress, strain and shock.

It is still a further object of the present invention to provide a protective surface for a fragile article which is considerably less expensive than conventional packing cartons for the same purpose.

Another object of the present invention is to provide a method for producing a protective surface for a rigid article such as a container. These and other objects will be apparent from the description which follows.

The present invention comprises a novel plastic coated fragile article having a coating of cellular plastic, preferably polystyrene, of differential density. In the preferred embodiment the coating is made adherent to the fragile article. Due to the differences in density of the polystyrene coating, the strength thereof is greatest where the density reaches a maximum and least where the density reaches a minimum. The present invention also includes a method for manufacturing the aforementioned plastic coated containers and incidentally thereto discloses apparatus for effecting the same.

The present invention will be more completely understood by reference to the following drawings in which:

FIGURE 1 is a perforated mold in section partly filled with heat expansible plastic beads which are partially expanded.

FIGURE 2 shows the article or carboy to be encased as centrally positioned within the mold cavity.

FIGURE 3 shows the mold cavity incompletely filled with additional heat expansible plastic beads.

FIGURE 4 shows the mold in closed position.

FIGURE 5 shows the mold closed with heat applied causing an expansion of the beads to enclose completely the carboy.

FIGURE 6 is a sectional view of a plastic coated bottle made in accordance with this invention.

FIGURE 7 is similar to FIGURE 4 but shows a non-perforated mold of different configuration.

Figure 8:
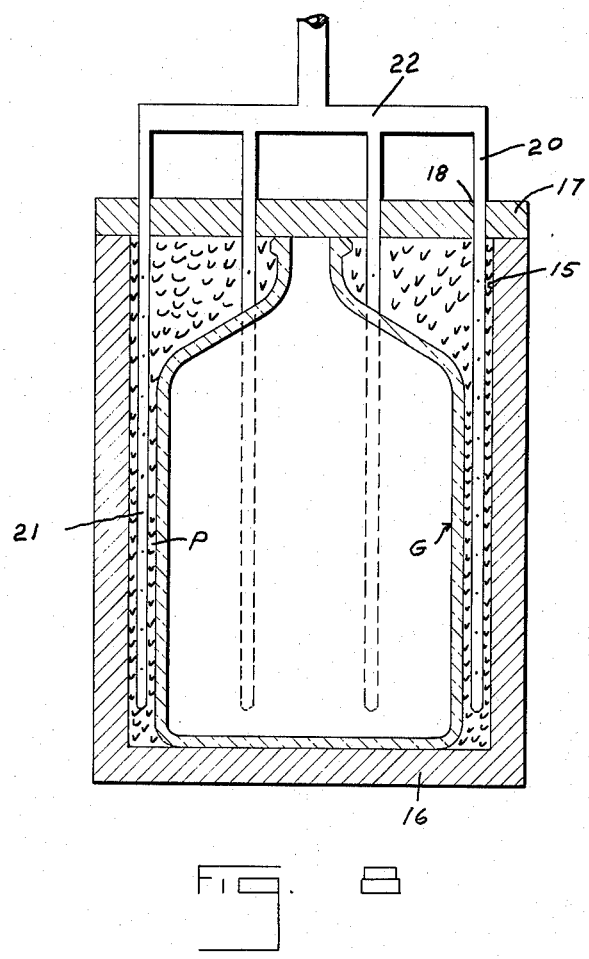
FIGURE 8 is an elevational view in cross section of another embodiment of this invention.

Referring to the drawings, the plastic coated container 1 shown in FIGURE 6, consists of a glass bottle G enveloped by a foamed plastic coating 2 of polystyrene of variable density. The most dense area is indicated as $c$, a less dense area as $b$, and the least dense area as $a$. Since area $c$ is the most dense with polystyrene, it is also the strongest which is most desirable since this is the area which is subject to the most mechanical shock due largely to dropping of the plastic coated container. Area $b$ which is less dense is found to be subject to the next greatest amount of mechanical shock due largely to lateral compressive forces. Finally it has been noted that area $a$ is usually subject to the least mechanical shock. However, this area is the least dense and accordingly has the least strength. The net result is that for a given amount of a plastic to be used as a coating, the plastic coated container of this invention provides the most efficient utilization of the plastic. It will be noted that if the container had a foamed plastic coating of uniform density, the strength thereof would be the same throughout such that certain areas which are subject to the least amount of shock would be stronger than necessary while areas which need to withstand greater impacts from mechanical forces would be of no greater density or strength, and accordingly would be more prone to breakage in those areas.

The relationship of density of foamed or cellular plastic to strength is illustrated by the following table:

TABLE I

*Correlation of strength with density*

| Density of Cellular Polystyrene Coating | Compressive Strength | Unnotched Impact Strength (Izod Test) |
|---|---|---|
| 2 lb. per cu. ft. | 18 p.s.i. | 2 in. lbs. per in. |
| 4 lb. per cu. ft. | 36 p.s.i. | 2.8 in. lbs. per in. |
| 6 lb. per cu. ft. | 55 p.s.i. | 3.5 in. lbs. per in. |

It will be apparent from the foregoing Table that if in FIGURE 6 the cellular polystyrene plastic has a 2 lb. per cut. ft. density in area $a$, a 4 lb. per cu. ft. density in area $b$, and a 6 lb. per cu. ft. density in area $c$, the surface of the plastic coated article will exhibit varying degrees of strength.

Although the density of plastic coating may vary from 2 to 6 lbs. per cu. ft., higher and lower ranges of densities can be employed depending upon how fragile the article being enclosed is. In certain applications densities ranging from 1 lb. per cu. ft. to a maximum of 3 lb. per cu. ft. may satisfactorily be employed.

It has also been noted that protective plastic lining is more effective if an adhesive 4 is applied between the plastic 2 and container 1 as shown in FIGURE 6.

The foam encased glass articles of the present invention have been found extremely resistant to breakage in spite of their light weight. For example, a 6½ gallon carboy encased in a conventional packing and wood enclosed box weighs 36½ lbs. and will survive a drop test of 85 inches. On the other hand a foam encases 6½ gallon carboy of this invention weighs only 18½ lbs. and does not break from the maximum testing distance used, namely, 90 inches. The test referred to is the standard I.C.C. swing test which consists of placing the carboy filled with water in a swing cradle and then swinging the cradle in pendulum fashion against an impact block for distances from 55″ to 90″. Whether the impact was directed against the side or bottom of the encased carboy, no breakage of the bottle occurred although in some tests involving side impacting the casing exhibited some cracking. However, this cracking did not occur where an adhesive was employed between the carboy and outer plastic casing.

The method and apparatus for making the plastic coated articles of this invention may best be understood by reference to FIGURES 1 through 5 inclusive. More specifically the steps in molding the plastic coated articles of this invention include first partly filled mold 3, which has hollow wall 6 with perforations 12 on its inner surface, with heat expansible plastic beads P which are partially expanded as shown in FIGURE 1 and thereafter centrally positioning by means of support 5 within the mold cavity the article or carboy G to be encased as indicated by FIGURE 2. With the carboy in position the mold is incompletely filled with additional heat expansible plastic beads as illustrated by FIGURE 3. Mold 3 is then closed by upper mold member 9, which is not perforated, and sealing plate 10 as shown by FIGURE 4. Superheated dry steam at 220–280° F. and 10–30 p.s.i. is introduced into the hollow mold walls 6 and 11 as shown by FIGURE 5 from a source of steam (not shown). The molding cycle takes from 15 to 60 seconds with perforated mold members depending upon the temperature of the steam and the material from which the mold is made. Of course where nonperforated mold members are employed the heating cycle will be longer. The same will be true where iron molds are used instead of aluminum molds. The introduction of the steam results not only in expanding the beads further so as to fill the mold cavity in areas 13 and 14 (compare FIGURES 4 and 5), but also causes the beads to fuse and coalesce in such a manner that the area around the neck of the container is least dense. The most dense area, and therefore the strongest, is the plastic which lies along the bottom and is indicated by $c$. Part of this increased density is due to the entrapment of the bead particles (see FIGURE 2) which does not permit the bead particles located in this area to expand freely and therefore to become less dense. So as to ensure a free flow of gas generated in the mold cavity, bleed passages 7 for the gas to escape are provided. In the preferred mode of operation an adhesive 4 is first applied to the container before insertion of the carboy G into the mold (see FIGURE 2). As mentioned above it has been noted that the protective plastic coating is still more resistant to breakage if an adhesive 4 is applied between the plastic 2 and container 1 as shown in FIGURE 6. After completion of the molding cycle the mold is allowed to cool, usually from 1 to 6 minutes, and the encased carboy thereafter removed. This cooling step may be accelerated by passing water through the hollow walls 6 of the mold after the steam heating step has been completed.

FIGURE 7 is similar to FIGURE 4 except that the article is of a different shape and corresponding parts are indicated by letter and number with a prime (′) thereafter. It will be noted in FIGURE 7 that neither the upper nor lower mold member has perforated walls to permit the steam to come into direct contact with the plastic beads for purposes of effecting an expansion and coalescence thereof. The apparatus of FIGURE 7 may be said to be illustrative of indirect steam heating of the plastic beads in contrast to the apparatus of FIGURES 1–5 which is illustrative of direct steam heating of the plastic beads.

Various adhesives either of the (1) drying type or (2) thermosetting type may be used. Representative of the drying type are Marbon 11670, a resin or rubber emulsion, made by the Marbon Corporation, Gary, Indiana, or Styrogrip 145–0, a resin or rubber solvent, made by the Hughes Glue Company, Detroit, Michigan. Typical of the thermosetting type are Hysol 2020 made by Houghton Laboratories, Olean, New York, and Epon VI made by the Shell Chemical Corporation, New York City, which are both of the cold setting epoxy type.

As a specific example of a suitable adhesive there can be mentioned, for instance, a liquid epoxy resin known as Epon 828 having an epoxide equivalent of 175–210 and a Gardner-Holdt viscosity at 25° C. of 50–150 poises, and prepared by the reaction of Bisphenol-A with epichlorohydrin to obtain condensation polymers having a basic structure believed to be as follows:

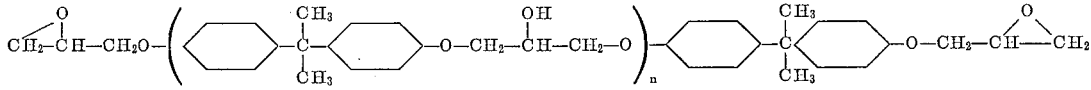

This resin is cured by mixture with about six parts of diethylaminopropylamine per 100 parts of resin. This mixture is coated on the container to which the plastic covering is to be bonded.

A plastic suitable for encasing the containers includes a polystyrene such as Dylite which is in the form of beads and manufactured by the Koppers Company, Inc., Pittsburgh, Pennsylvania. These polystyrene beads contain a volatile liquid, n-pentane, as an expanding agent. Particulate polystyrene containing any volatile liquid expanding agent can be employed. These beads can be given a pre-expansion treatment which consists of heating the original or virgin beads from 180–240° F. until densities ranging from 1 to 5 lbs. per cubic feet are obtained depending upon the density desired. However, any plastic can be used which is capable of being formed and further expanded upon the application of additional heat in the manner described above.

It is understood that the invention described above is a preferred embodiment particularly as exemplified by the direct steam heating method and apparatus; and that certain variations can be made without limiting the scope of the invention herein disclosed. By way of example the mold cavity can have other shapes than that shown and the upper mold member 9 can also be perforated. Also the mold may be completely filled with the heat expansible plastic beads if a greater density is desired at the upper portion of the encased article. Moreover, the steam heating means can be placed by other heating means such as by resistance or inductance electrical heating, if found desirable. In addition other fluids than steam capable of being heated to high temperatures without decomposition can be employed. To facilitate removal of the encased carboy the mold members 3 and 9 can be coated with any of the well-known mold release agents or lubricants such as the silicones. Finally the carboy can be preheated prior to placement in the mold so as to avoid any breakage due to thermal shock during the heating of the plastic beads. Other appropriate changes can be made within the skill of one familiar with the art without circumscribing or limiting the invention set forth herein, and the invention can take other forms as a result of these changes and yet come within the scope of the appended claims.

An alternative embodiment of my invention is illustrated in FIGURE 8. Therein, the glass container G is shown positioned as an inner wall of a mold cavity 15. The container G may rest on a block of previously foamed polystyrene, or on a portion of the heat expansible beads P as shown in FIGURE 2. In addition, the container G may merely rest on the bottom plate 16 as is shown in FIGURE 8.

The space between the mold covity 15 and the walls of container G is then partially or completely filled with heat expansible beads P. If partially preexpanded beads are used, the space will normally be completely filled with the beads (except for the interstices). Even if unexpanded beads are used the space can be completely filled. The top 17 of the mold is then put in place and secured by clamps (not shown) or other means to the mold 15.

The top 17 is provided with a plurality of holes 18 which receive steam probes 20. The steam probes 20 are then forced through the holes 18 and into the heat expansible beads P as is more clearly shown in FIGURE 8. The probes 20 can be made of hollow steel tubing or other suitable material. A plurality of holes 21 are provided along the length of the probes 20 for the introduction of steam into the heat expansible beads to expand and mold the beads in place about the container.

Steam is introduced into the probes 20 from the steam manifold 22 which is connected to a source of supply (not shown). Each probe 20 is provided with a plurality of holes 21 through which the steam may pass to the beads P. The duration of the steam introduction and the pressure can vary considerably. For instance, for a six and one-half gallon glass carboy, the steam is turned on for a period of 8 to 11 seconds at 28 p.s.i. During this time the beads P will expand and completely fill the interstices between the beads and be fused into a protective and/or decorative coating for the container.

The number of probes 20 utilized will vary depending upon the desires of the operator and the size of the container to be protected. For instance, with the above carboy, eight probes are placed on a 13¾ inch diameter circle. This enabled the steam jetting from the holes 21 to completely encircle the carboy.

After the introduction of steam is discontinued, the probes are withdrawn and the mold remains closed until the polystyrene has cooled. This time will vary considerably from a few minutes to over four hours depending upon the degree of cooling to which the mold is subjected. By removing the probes immediately upon discontinuance of the steam, the continued expansion of the beads P will completely fill the spaces left by the probes 20.

As can be seen from the foregoing, FIGURE 8 illustrates an alternative procedure by which a container may be protected by the use of an expanded polystyrene covering of pleasing appearance.

Although glass has been shown as the preferred composition of the article being encased by the plastic, it is to be understood that the article to be encased can be made of wood, metal or plastic.

From the foregoing description it will be apparent that the applicant has devised a plastic coated article, including a method and apparatus for making the same, which is light in weight, resistant to mechanical impact, pleasing in appearance, and relatively inexpensive to make.

Having thus described the invention it will be evident to those skilled in the art that various modifications may be made which would not depart from the spirit of the present invention as defined in the following claims.

I claim:

1. In a method of molding in situ about an article a covering having walls of variable density from a charge of heat expansible thermoplastic beads, the steps comprising partially filling a mold cavity with said charge, centrally positioning said article in the mold cavity on said charge, introducing additional heat expansible thermoplastic beads but not as to fill the mold cavity completely, closing the mold cavity, thereafter applying heat to said charge for the purpose of expanding and surface fusing the beads, cooling the resulting charge, and removing the article with the enveloping cover from the mold whereby that foamed portion corresponding to said first charge is more dense than the remaining foamed portion.

2. The method of claim 1 in which the beads are polystyrene.

3. In a method of molding in situ about an article a covering having walls of variable density from a charge of partially expanded, heat expansible thermoplastic polymer of styrene in particle form, the steps comprising partially filling a mold cavity with said charge, centrally positioning said article in the mold cavity of said charge, introducing additional heat expansible thermoplastic beads but not as to fill the mold cavity completely, closing the mold cavity, thereafter applying heat to said charge for the purpose of expanding and surface fusing the beads, cooling the resulting charge, and removing the article with the enveloping covering from the mold whereby that foamed portion corresponding to said first charge is more dense than the remaining foamed portion.

4. In a method of molding in situ about an article a covering having walls of variable density from a charge of partially expanded, heat expansible thermoplastic polymer of styrene in particle form, the steps comprising partially filling a mold cavity with said charge, preheating the article to be covered, centrally positioning said article in the mold cavity on said charge, introducing additional heat expansible thermoplastic beads but not as to fill the mold cavity completely, closing the mold cavity, thereafter applying heat to said charge for the purpose of expanding and surface fusing the beads, cooling the resulting charge, and removing the article with the enveloping covering from the mold whereby that foamed portion corresponding to said first charge is more dense than the remaining foamed portion.

5. A method of ornamenting and protecting a substantially rigid container part which comprises, employing the container part as an inner wall of a mold cavity, filling the mold cavity about the container part with beads of expandable polystyrene, injecting steam within the mold cavity to heat-expand and mold the polystyrene beads in place about the container part and set-form an outer resilient shell about the rigid container part.

6. In a method of molding in stiu about an article a protective and decorative covering from a charge of heat expansible thermoplastic beads, the steps comprising positioning said article in a mold cavity spaced from the walls of said mold to form a space between the mold walls and said article, introducing heat expansible thermoplastic beads into said space, closing the mold cavity, thereafter applying heat to said charge and thereby expanding and surface fusing said beads, cooling the resulting charge, and removing the article with the enveloping cover from the mold.

7. In a method of molding in situ about an article a protective and decorative covering from a charge of heat expansible thermoplastic beads, the steps comprising centrally positioning said article in a mold cavity, introducing heat expansible thermoplastic beads into said mold cavity to completely fill the same, closing the mold cavity, inserting steam probes into said charge, introducing steam through said probes into the charge and thereby expanding and surface fusing the beads, cooling the resulting charge, and removing the article with the enveloping cover from the mold.

8. The method of claim 7 in which the beads are polystyrene.

References Cited by the Examiner

UNITED STATES PATENTS 2,787,809 4/1957 Stastny _____ 264—53
2,983,963 5/1961 Jodell et al. _____ 264—46

ALEXANDER H. BRODMERKEL, *Primary Examiner.*

WILLIAM J. STEPHENSON, MICHAEL V. BRINDISI, *Examiners.*